US012567037B2

(12) United States Patent
Frattura et al.

(10) Patent No.: US 12,567,037 B2
(45) Date of Patent: Mar. 3, 2026

(54) LEARNING ACCELERATION USING INSIGHT-ASSISTED INTRODUCTIONS

(71) Applicant: Dell Products L.P., Round Rock, TX (US)

(72) Inventors: David Edward Frattura, Stamford, CT (US); Stephen James Todd, North Andover, MA (US); Eloy Francisco Macha, Crowley, TX (US); Robert Anthony Lincourt, Jr., Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 271 days.

(21) Appl. No.: 18/162,314

(22) Filed: Jan. 31, 2023

(65) Prior Publication Data

US 2024/0257055 A1     Aug. 1, 2024

(51) Int. Cl.
G06Q 10/101 (2023.01)
G06Q 10/10 (2023.01)
G06Q 30/04 (2012.01)

(52) U.S. Cl.
CPC ................................. G06Q 10/101 (2013.01)

(58) Field of Classification Search
CPC .................................................... G06Q 10/101
USPC .......................................... 705/1.1, 300, 319
See application file for complete search history.

(56) References Cited

U.S. PATENT DOCUMENTS

| | | | | |
|---|---|---|---|---|
| 7,512,612 | B1 * | 3/2009 | Akella | ................... H04L 51/52 |
| 7,805,440 | B2 * | 9/2010 | Farrell | ................ G06F 16/9024 |
| | | | | 707/728 |
| 8,396,884 | B2 * | 3/2013 | Singh | .................. G06F 16/9024 |
| | | | | 707/E17.03 |
| 11,785,059 | B1 * | 10/2023 | Balaji | ................. H04L 65/4015 |
| | | | | 715/753 |
| 11,947,598 | B2 * | 4/2024 | Zhou | .................... G06F 16/9024 |
| 2004/0210550 | A1 * | 10/2004 | Williams | ............. G06Q 10/105 |

(Continued)

OTHER PUBLICATIONS

Totet, Matthieu, K-partite and Bipartite Graph (Multimode Networks Transformations), Gephi Tutorials, Documentation for Gephi: core functions and plugins, Jan. 29, 2017 (Last modified: Sep. 22, 2021), pp. 1-8 (p. No. Added by Examiner), (Retrieved from the Web Archive/ Wayback Machine_20220325072847) (Year: 2021).*

*Primary Examiner* — Jonathan P Ouellette
(74) *Attorney, Agent, or Firm* — Chamberlain, Hrdlicka, White, Williams & Aughtry; Aly Z. Dossa

(57) ABSTRACT

A method and system for learning acceleration using insight-assisted introductions. More often than not, and still overwhelmingly unresolved due to difficulty in its identification, the duplication of work and effort, across large organizations, tend to grossly contribute to the many inefficiencies afflicting said organizations. One approach to minimizing, if not eliminating, this dilemma may be through the encouragement of collaborations. Finding the appropriate talent(s) within a large organization, however, to pursue said collaborations poses yet another hindrance. Embodiments disclosed herein, accordingly, leverage captured user metadata, as well as graph techniques, to identify organization personnel best suited for collaborations involving at least partially overlapping subject matter.

11 Claims, 11 Drawing Sheets

System 100

(56)　　　　References Cited

U.S. PATENT DOCUMENTS

| | | | | |
|---|---|---|---|---|
| 2005/0038533 | A1* | 2/2005 | Farrell | G06F 16/9024 |
| | | | | 707/E17.011 |
| 2009/0138430 | A1 | 5/2009 | Nambiar et al. | |
| 2012/0096002 | A1* | 4/2012 | Sheehan | G06Q 50/01 |
| | | | | 707/E17.046 |
| 2014/0223467 | A1 | 8/2014 | Hayton et al. | |
| 2015/0169758 | A1* | 6/2015 | Assom | G06F 16/36 |
| | | | | 707/603 |
| 2015/0356431 | A1 | 12/2015 | Saxena et al. | |
| 2016/0092404 | A1 | 3/2016 | Farouki et al. | |
| 2016/0269328 | A1 | 9/2016 | Pola | |
| 2017/0103352 | A1* | 4/2017 | Kurjanowicz | G06Q 50/01 |
| 2017/0316098 | A1* | 11/2017 | Meyerzon | G06F 16/90328 |
| 2017/0371881 | A1* | 12/2017 | Reynolds | G06F 16/248 |
| 2018/0115603 | A1* | 4/2018 | Hu | G06Q 50/01 |
| 2018/0218042 | A1 | 8/2018 | Krishnan et al. | |
| 2018/0324976 | A1 | 11/2018 | Gao et al. | |
| 2019/0050874 | A1 | 2/2019 | Matlick et al. | |
| 2019/0213516 | A1* | 7/2019 | Zhuravel | G06Q 10/067 |
| 2020/0019822 | A1 | 1/2020 | Kothandaraman et al. | |
| 2020/0342006 | A1* | 10/2020 | Rossi | G06F 16/285 |
| 2021/0042438 | A1* | 2/2021 | Scheideler | G06F 21/6227 |
| 2021/0304044 | A1* | 9/2021 | Nagarajan | G06N 5/04 |
| 2021/0342125 | A1 | 11/2021 | Burnett | |
| 2021/0406449 | A1* | 12/2021 | Meling | G06F 40/166 |
| 2021/0406804 | A1* | 12/2021 | Hamid | G06Q 10/06398 |
| 2022/0188698 | A1 | 6/2022 | Halecky et al. | |
| 2022/0284340 | A1* | 9/2022 | Choudhary | G06N 20/10 |
| 2022/0361376 | A1 | 11/2022 | Gao | |
| 2023/0214949 | A1* | 7/2023 | Eidelman | G06Q 50/18 |
| | | | | 705/311 |
| 2023/0353651 | A1* | 11/2023 | Maurer | H04L 67/54 |
| 2023/0376496 | A1* | 11/2023 | Jacob | G06F 16/285 |
| 2024/0119417 | A1* | 4/2024 | Sorensen | G06N 20/00 |
| 2024/0138106 | A1 | 4/2024 | Duncan et al. | |

* cited by examiner

Example Uni-Partite Connected Graph 220

Node Set A 222
(*e.g.*, Documents)

N0
N1
N2
N3
N4
N5
N6
N7
N8
N9

Example Bi-Partite Connected Graph 230

Node Set A 232
(*e.g.*, Documents)

N0
N2
N4
N7
N8
N9

Node Set B 234
(*e.g.*, Authors)

N1
N3
N5
N6

Example Multi-Partite Connected Graph 240

Node Set A 242
(e.g., Documents)

N3
N4
N6
N7
N9

Node Set B 244
(e.g., Authors)

N0
N2
N5

Node Set C 246
(e.g., Topics)

N1
N8

LEARNING ACCELERATION USING INSIGHT-ASSISTED INTRODUCTIONS

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for processing introduction queries. The method includes: receiving an introduction query including at least one interest; obtaining a metadata graph representative of a user catalog; filtering, based on the at least one interest, the metadata graph to identify at least one node subset; generating a k-partite metadata graph using the at least one node subset; and identifying at least one organization user based on the k-partite metadata graph.

In general, in one aspect, embodiments disclosed herein relate to a non-transitory computer readable medium (CRM). The non-transitory CRM includes computer readable program code, which when executed by a computer processor, enables the computer processor to perform a method for processing introduction queries. The method includes: receiving an introduction query including at least one interest; obtaining a metadata graph representative of a user catalog; filtering, based on the at least one interest, the metadata graph to identify at least one node subset; generating a k-partite metadata graph using the at least one node subset; and identifying at least one organization user based on the k-partite metadata graph.

In general, in one aspect, embodiments disclosed herein relate to a system. The system includes: a client device; and an insight service operatively connected to the client device, and including a computer processor configured to perform a method for processing introduction queries. The method includes: receiving, from the client device, an introduction query including at least one interest; obtaining a metadata graph representative of a user catalog; filtering, based on the at least one interest, the metadata graph to identify at least one node subset; generating a k-partite metadata graph using the at least one node subset; and identifying at least one organization user based on the k-partite metadata graph.

Other aspects disclosed herein will be apparent from the following description and the appended claims.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5C, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to learning acceleration using insight-assisted introductions. More often than not, and still overwhelmingly unresolved due to difficulty in its identification, the duplication of work and effort, across large organizations, tend to grossly contribute to the many inefficiencies afflicting said organizations. One approach to minimizing, if not eliminating, this dilemma may be through the encouragement of collaborations. Finding the appropriate talent(s) within a large organization, however, to pursue said collaborations poses yet another hindrance. Embodiments disclosed herein, accordingly, leverage captured user metadata, as well as graph techniques, to identify organization personnel best suited for collaborations involving at least partially overlapping subject matter.

Figure 1A:
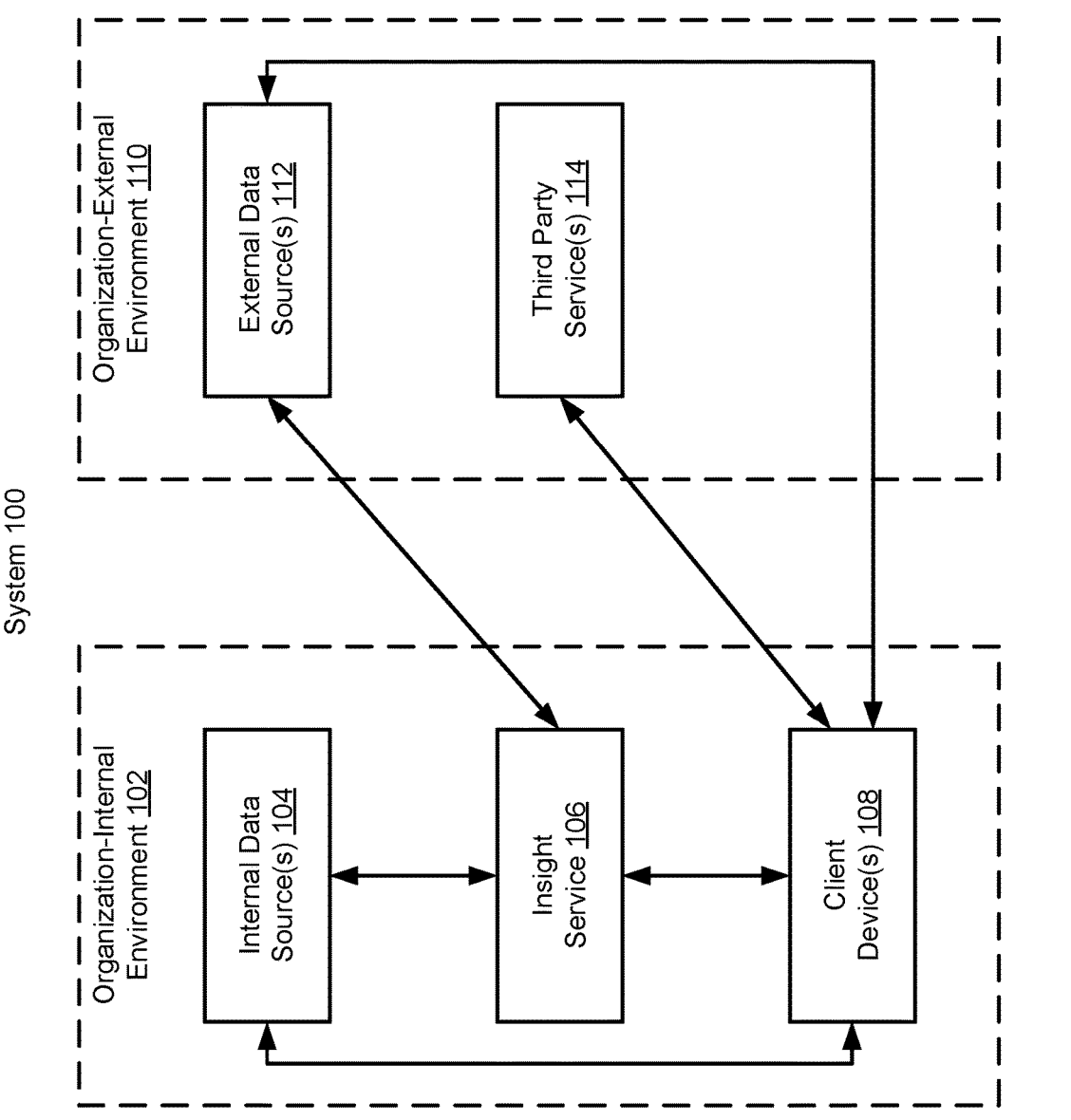
FIG. 1A shows a system in accordance with one or more embodiments disclosed herein.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: learning acceleration using insight-assisted introductions, as described in FIG. 3 as well as exemplified in FIGS. 5A-5C, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
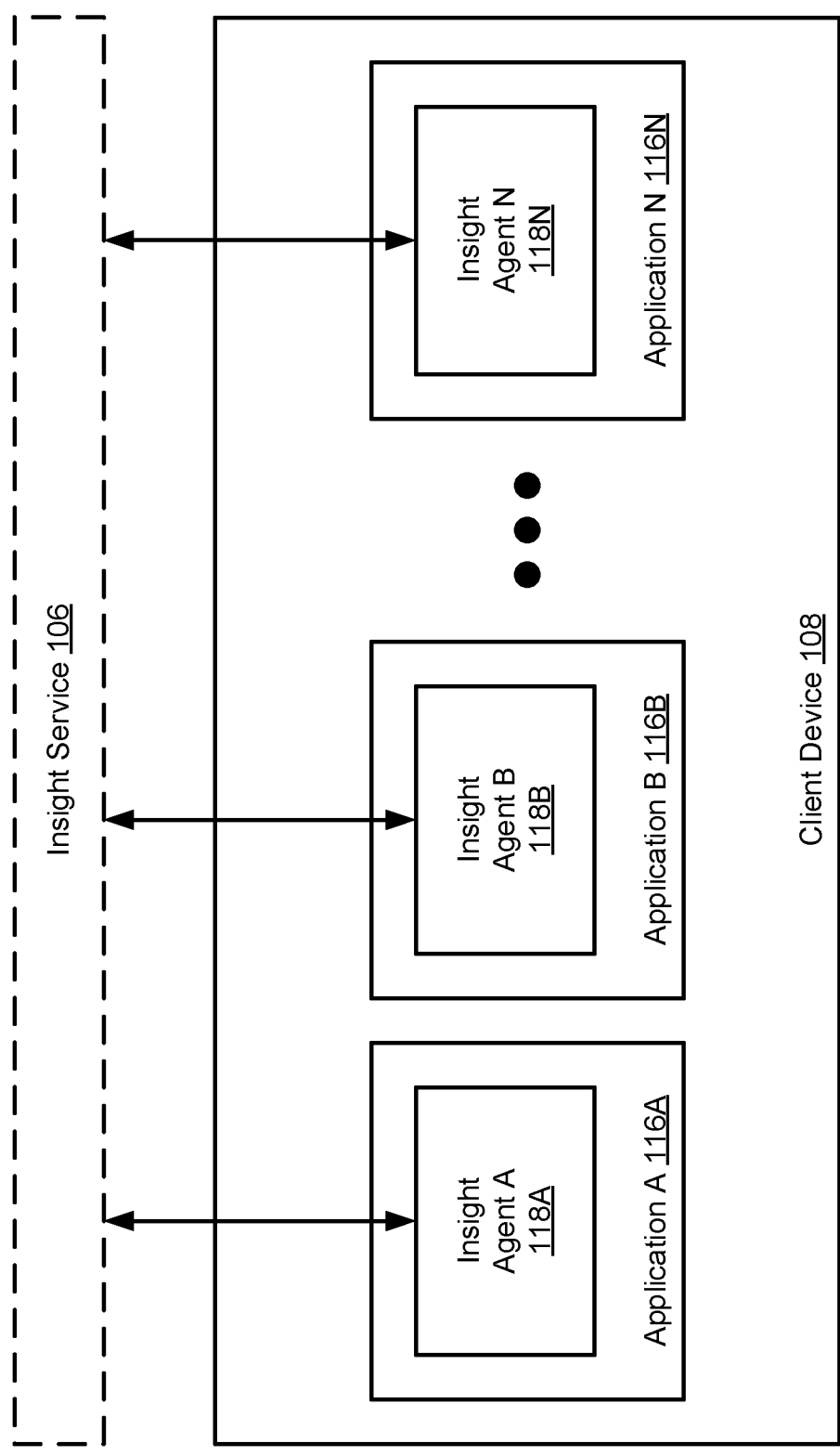
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
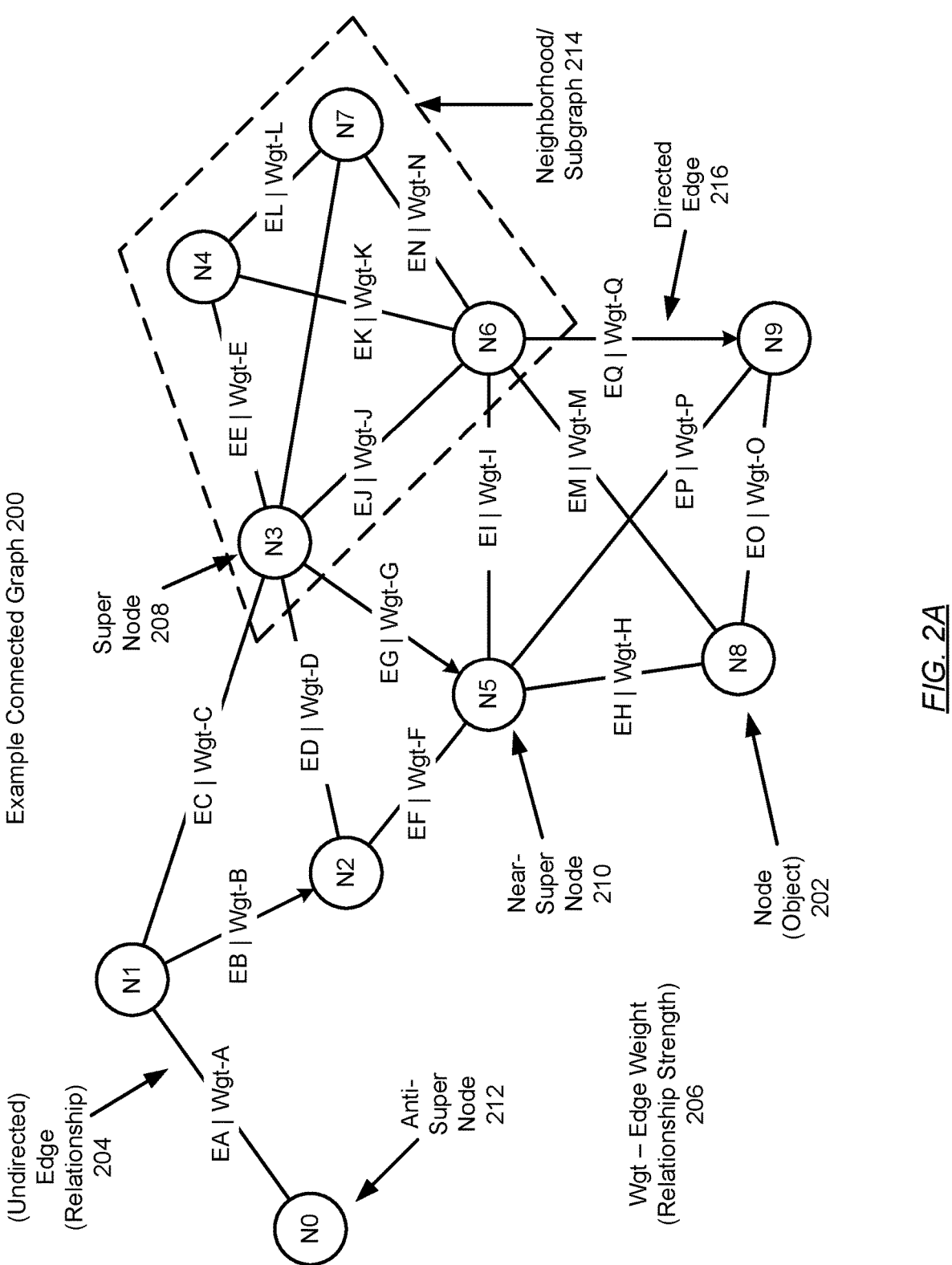
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, . . . , N9) interconnected by a set of edges (204, 216) (denoted in the example by the lines labeled EA, EB, EC, . . . , EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, . . . , Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
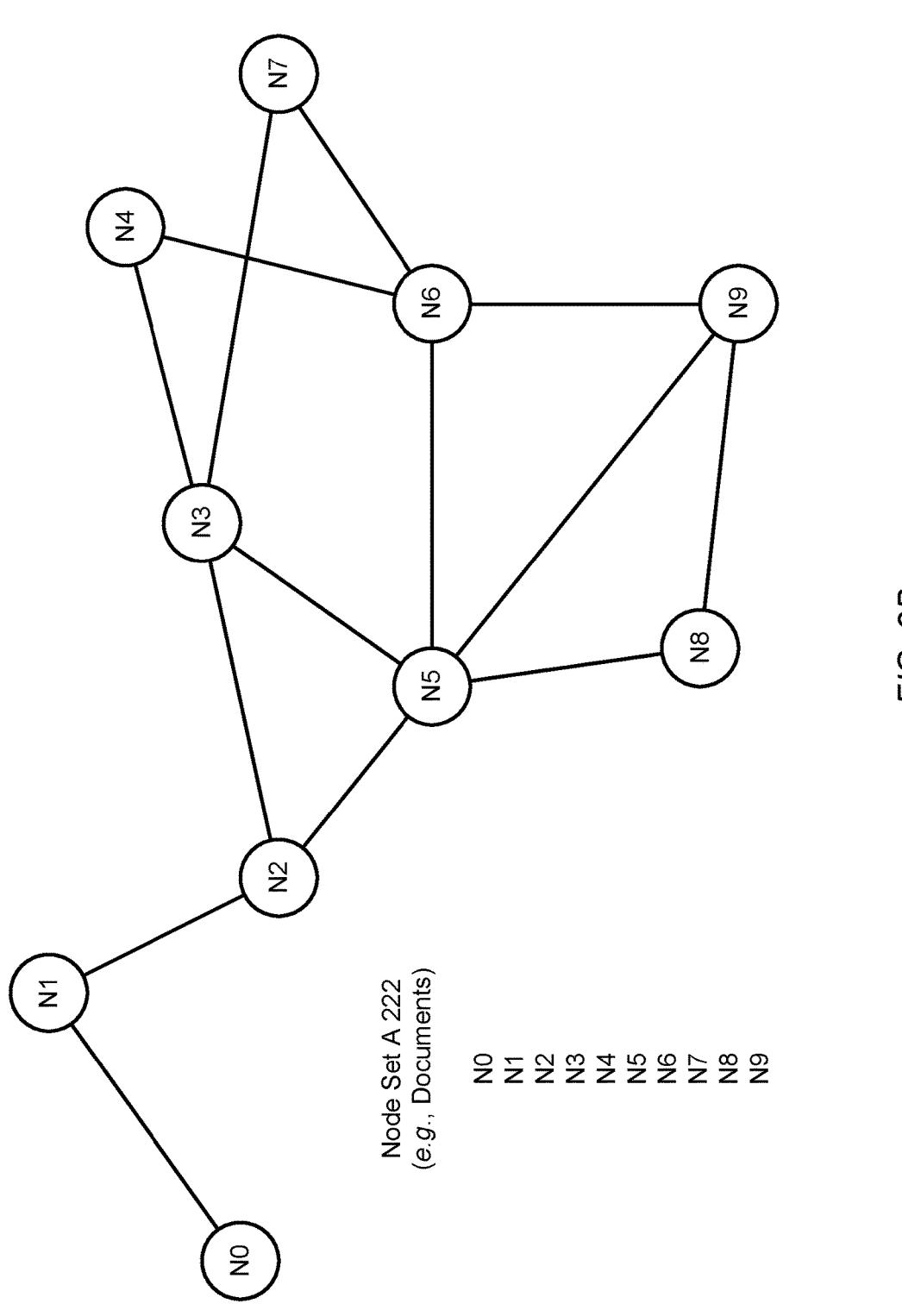
FIGS. 2B-2D show example k-partite connected graphs in accordance with one or more embodiments disclosed herein.
Figure 2C:
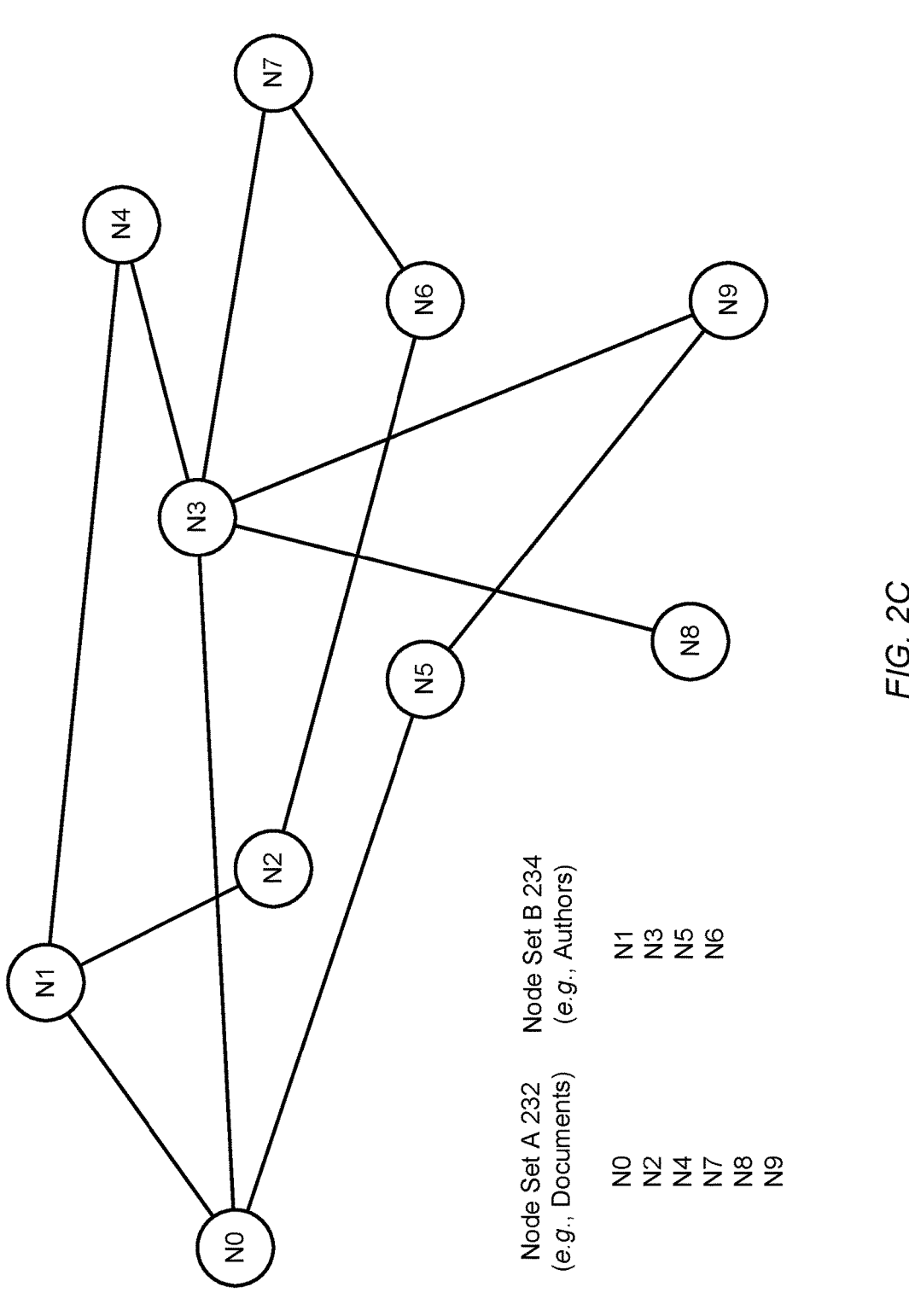
Figure 2D:
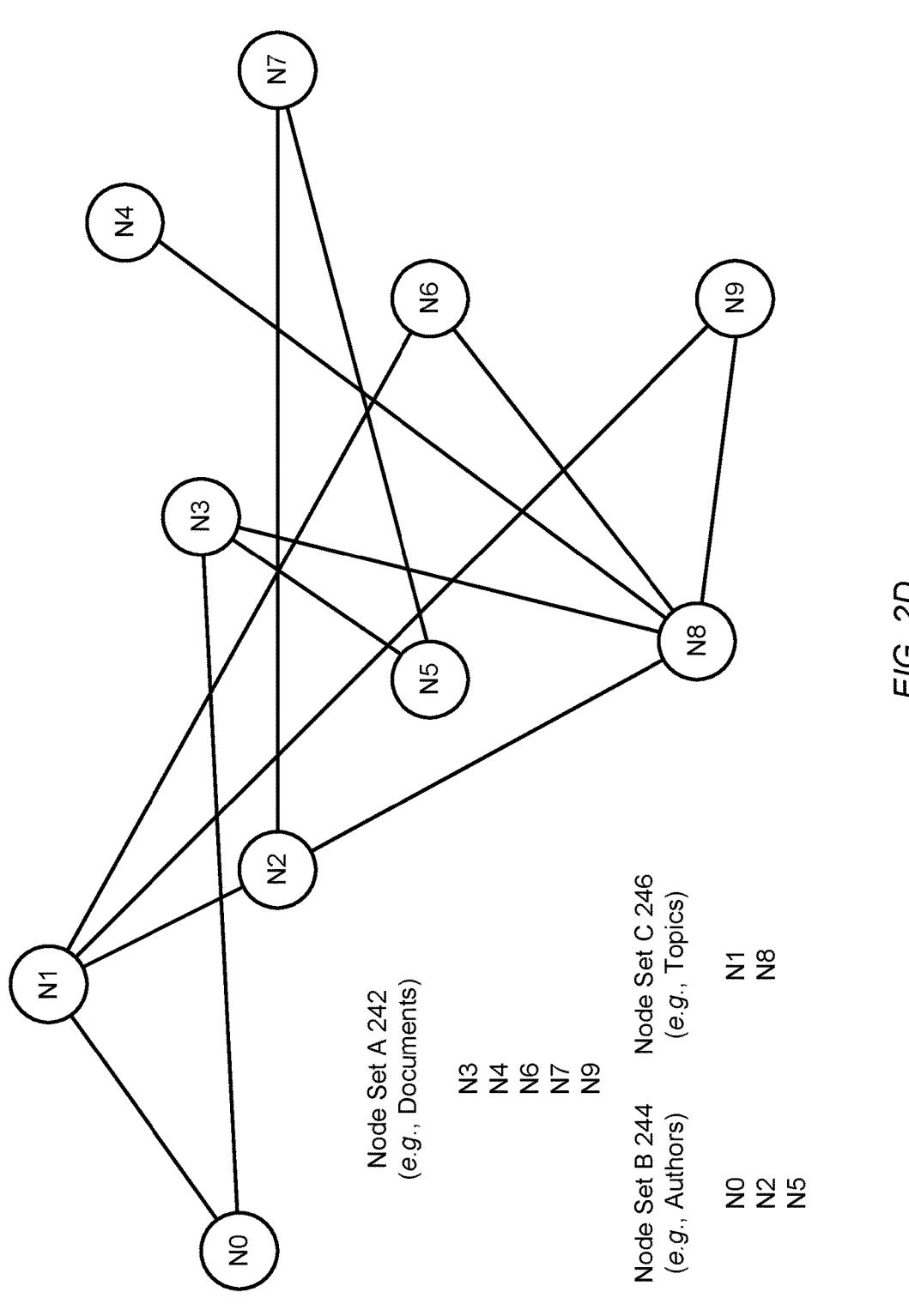

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, . . . , N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled NO, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled NO, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3:
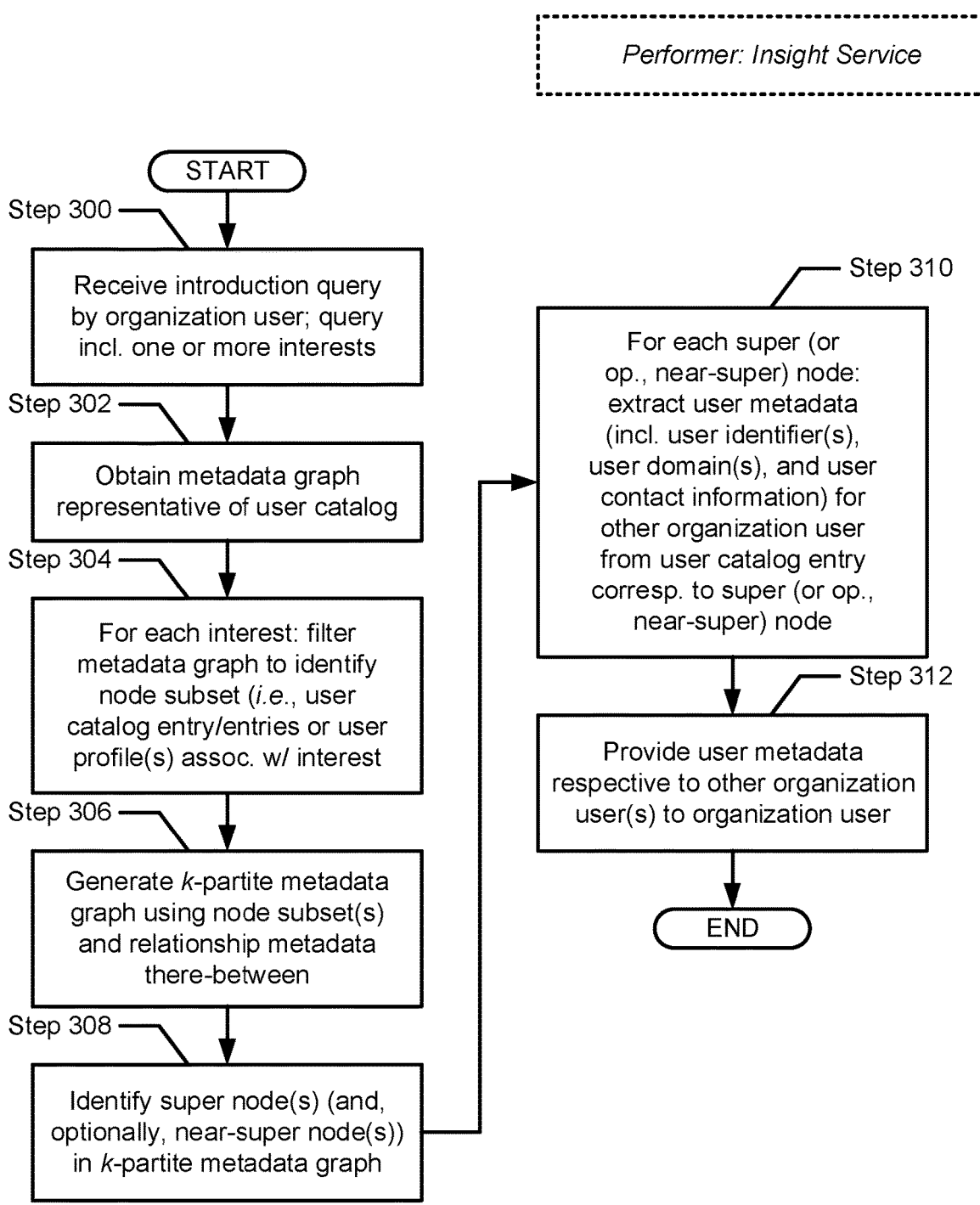
FIG. 3 shows a flowchart describing a method for learning acceleration using insight-assisted introductions in accordance with one or more embodiments disclosed herein.

FIG. 3 shows a flowchart describing a method for learning acceleration using insight-assisted introductions in accordance with one or more embodiments disclosed herein. The various steps outlined below may be performed by an insight service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an introduction query is received. In one or many embodiment(s) disclosed herein, the introduction query may include or specify one or more interests. An interest may refer to a subject or domain through which introductions between organization users may be suggested. As such, the introduction query may have been submitted by an (inquiring) organization user, and may represent an inquiry, by the organization user, with regards to other organization user(s) that may share matching/similar fascinations, or may be acknowledged as subject matter expert(s) in said interest(s). Accordingly, the organization user may seek out the other organization user(s) in order to prospectively pursue and/or produce joint collaborative work directed to, for example, one or more research and/or organization goals.

In Step 302, a metadata graph is obtained. In one or many embodiment(s) disclosed herein, the metadata graph may refer to a connected graph (see e.g., FIG. 2A) representative of a user catalog. To that end, the metadata graph may include a set of nodes interconnected by a set of edges, where the set of nodes are representative of user catalog entries (also referred to herein as user profiles) and the set of edges are representative of connections or relationships there-between. Further, each node may pertain to a given organization user within an organization (e.g., a commercial business, an educational institution, etc.) where the representative user catalog entry (or user profile) thereof may store metadata for, or information descriptive of, the given organization user.

In one or many embodiment(s) disclosed herein, a user profile for any given organization user may refer to a collection of settings and information associated with the given organization user. Examples of said user metadata (or collection of settings/information) may include, but is not limited to: one or more user identifiers (e.g., a username assigned to the given organization user within an organization, the personal name with which the given organization user may be referred, etc.); one or more user domains (e.g., one or more subjects, topics, specialties, and/or interests to which the given organization user contributes and in which the given organization user may be knowledgeable; and user contact information (e.g., personal and/or organization phone number(s) through which the given organization user may be reached via existing telephonic technologies, personal and/or organization email address(es) through which the given organization user may be reached via existing electronic mail technologies, etc.). User metadata is not limited to the aforementioned specific examples.

In Step 304, for each interest of the interest(s) (received via the introduction query in Step 300), the metadata graph (obtained in Step 302) is filtered based on the interest. In one or many embodiment(s) disclosed herein, filtering of the metadata graph may, for example, entail topic matching (e.g., case-insensitive word or phrase matching) between a given interest and the user metadata for organization users catalogued in the user catalog entries (or user profiles) of which nodes of the metadata graph are representative. Further, for each interest, the filtering of the metadata graph based thereon may result in the identification of a node subset of the set of nodes forming the metadata graph. The identified node subset, subsequently, may include one or more nodes representative of one or more organization users, respectively, that may be associated with the interest.

In Step 306, a k-partite metadata graph is generated using the node subset(s) (identified in Step 304). In one or many embodiment(s) disclosed herein, the k-partite metadata graph (see e.g., FIGS. 2B-2D) may reflect a new representation of, which may be based on one or more particular perspectives on, the metadata graph (obtained in Step 302). The k-partite metadata graph, further, may reflect a connected graph that encompasses k independent sets of nodes (i.e., the node subset(s), where k equals the number or cardinality of node subset(s)) and a set of edges interconnecting (and thus defining relationships between) pairs of nodes each belonging to a different independent set of nodes (or node subset)— with the exception of uni— (k=1) partite metadata graphs (see e.g., FIG. 2B) where the set of edges interconnect nodes of the single independent set of nodes (or single node subset) forming the uni-partite metadata graphs.

In Step 308, one or more super nodes, in/of the k-partite metadata graph (generated in Step 306), is/are identified. In one or many embodiment(s) disclosed herein, a super node may refer to a densely connected node or a node with a disproportionately high number of edges connected thereto. Additionally, or alternatively, a super node may be identified as any node representing a most connected node (e.g., any node that serves as an endpoint of a pair of endpoints to a highest number of edges) in the k-partite metadata graph, which may otherwise be defined as any node that serves as an endpoint of a pair of endpoints to a number of edges, where the number of edges meets or exceeds a threshold number of edges (that may be dynamically set). For example, the threshold number of edges may be set to ten edges, where any node(s) in the k-partite metadata graph that serves as an endpoint (of a pair of endpoints) to at least ten edges may be classified or labeled as a super node in/of the k-partite metadata graph.

Optionally, one or more near-super nodes, in/of the k-partite metadata graph (generated in Step 306), is/are further identified. In one or many embodiment(s) disclosed herein, a near-super node may refer to any node that nearly satisfies, but still falls short, of the criterion/criteria for being classified or labeled as a super node. Additionally, or alternatively, a near-super node may be identified or defined as any node that serves as an endpoint of a pair of endpoints to a second number of edges, where the second number of edges lies below the above-mentioned threshold number of edges (i.e., serving as the criterion for identifying super nodes), however, meets or exceeds a second threshold number of edges (that may also be dynamically set). For example, the threshold number of edges may be set to ten edges and the second threshold number of edges may be set to seven edges, where any node(s) in the k-partite metadata graph that serves as an endpoint (of a pair of endpoints) to at least seven edges, but no more than nine edges, may be classified or labeled as a near-super node.

In Step 310, for each super node of the super node(s) (identified in Step 308), and/or for each near-super node of the near-super node(s) (optionally identified in Step 308), at least a portion of user metadata, for another organization user (i.e., not the organization user that submitted the introduction query) corresponding to the super node, and/or near-super node, is extracted. In one or many embodiment(s) disclosed herein, the extracted portion of user metadata may include, but is not limited to, one or more user identifiers, one or more user domains, and user contact information (all briefly defined above—see e.g., Step 302) associated with the other organization user.

In Step 312, the at least portion of user metadata (extracted in Step 310), respective to one or more other organization users, is provided in response to the introduction query (received in Step 300). Particularly, in one or many embodiment(s) disclosed herein, the at least portion of user metadata may be provided to the organization user who had submitted the introduction query.

Figure 4:
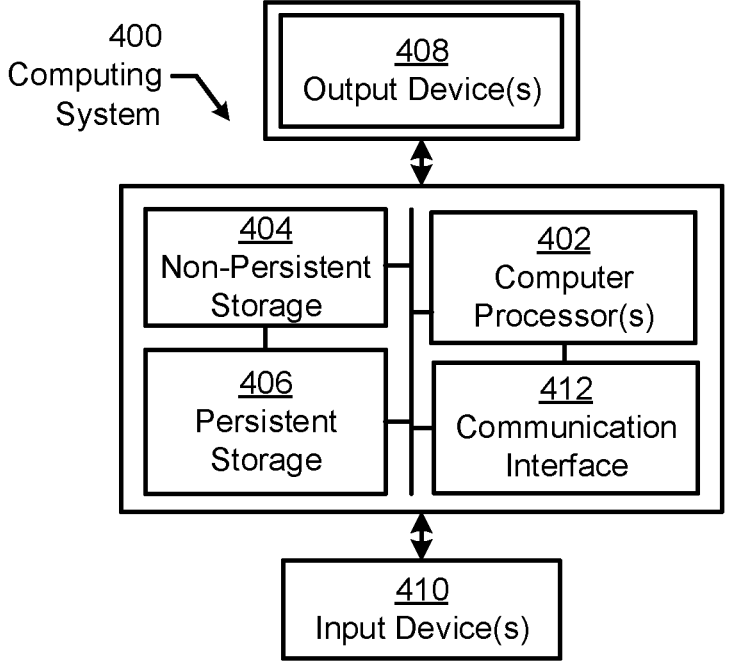
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
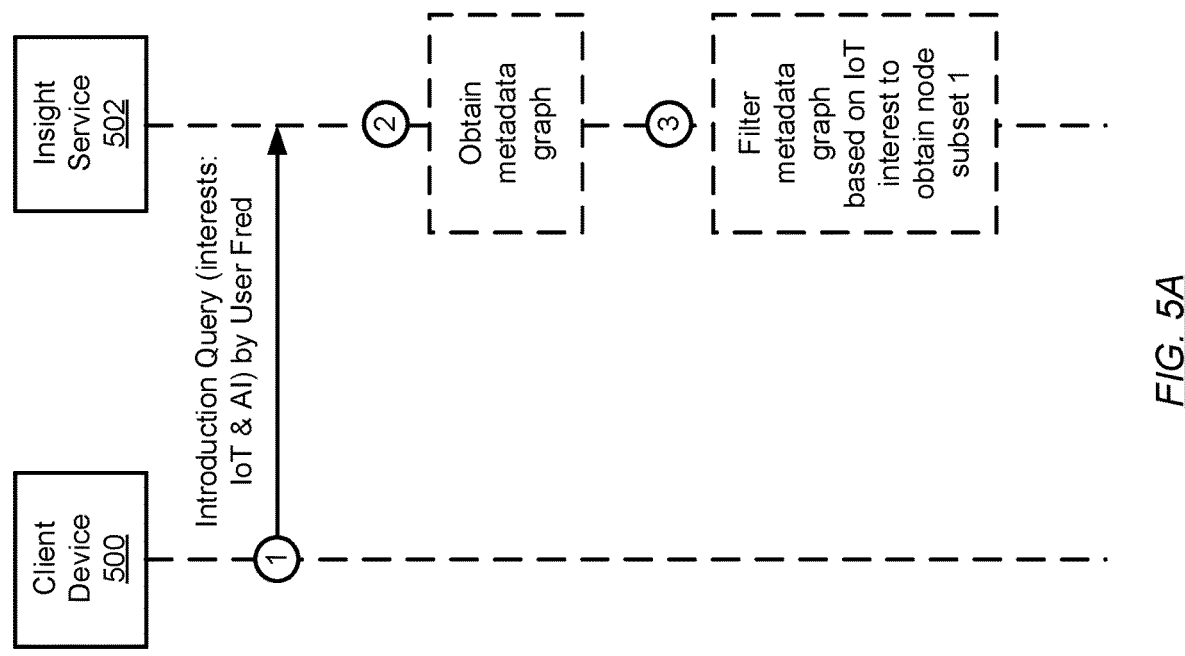
FIGS. 5A-5C show an example scenario in accordance with one or more embodiments disclosed herein.
Figure 5B:
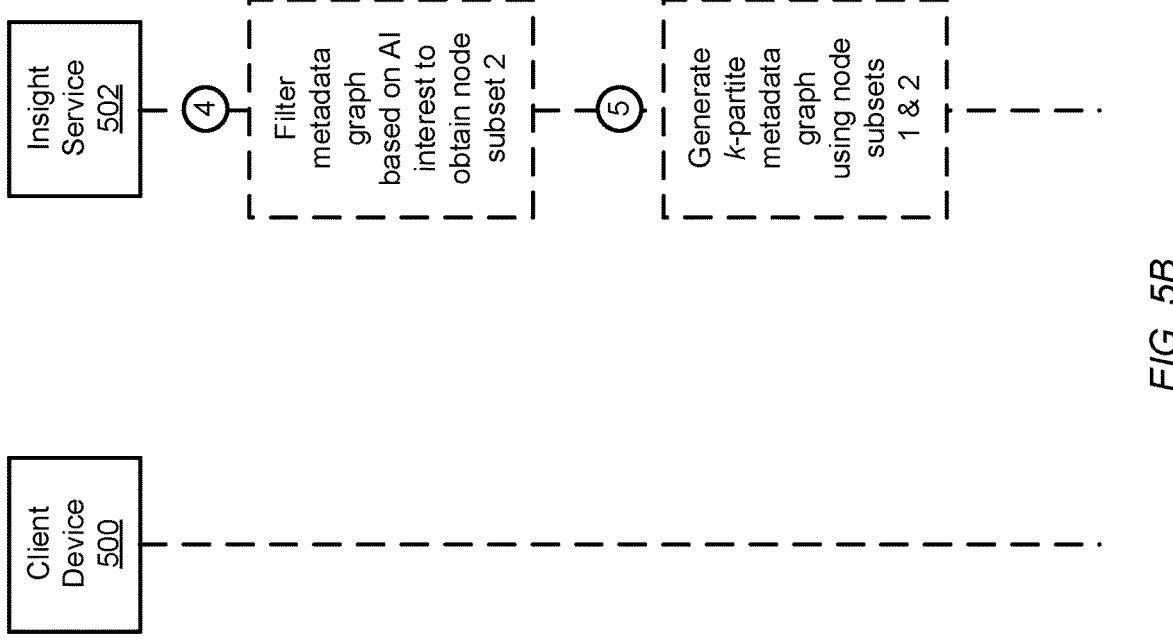
Figure 5C:
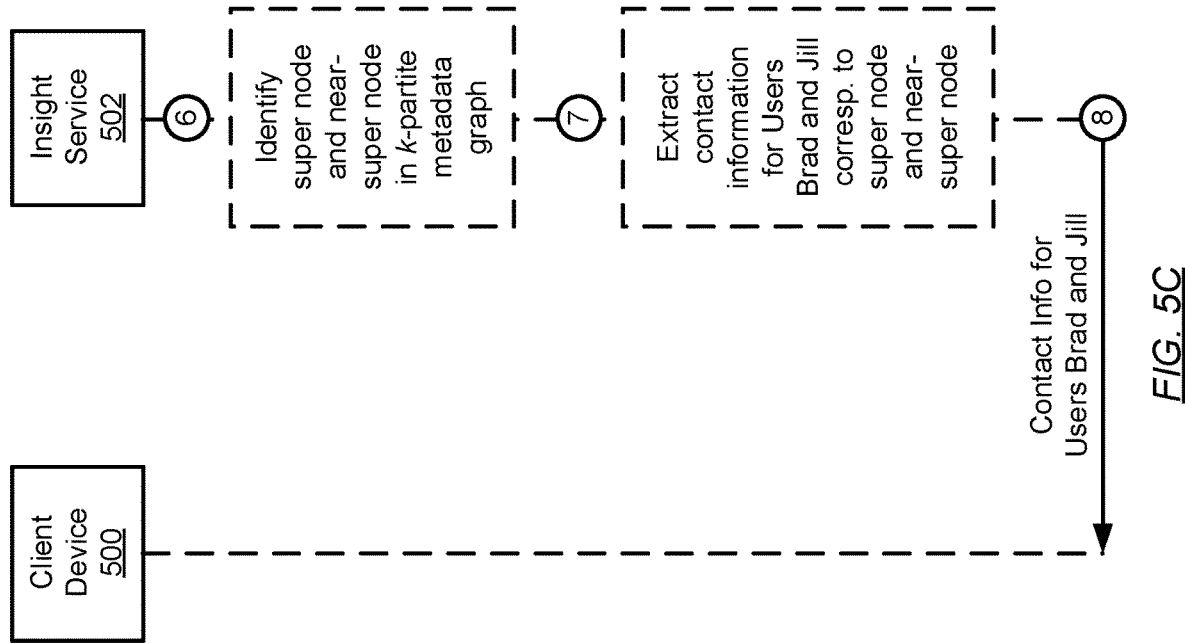

FIGS. 5A-5C show an example scenario in accordance with one or more embodiments disclosed herein. The example scenario, illustrated through FIGS. 5A-5C and described below, is explanatory purposes only and not intended to limit the scope disclosed herein.

Hereinafter, consider the following example scenario whereby an organization user, identified as Fred, seeks other organization user(s) (e.g., one or more collaborators) for co-authoring a journal article, respective to the Internet of Things (IOT) and artificial intelligence (AI) spaces, in a technical/scientific journal. To that end, Fred relies on the disclosed capability of learning acceleration using insight-assisted introductions by the insight service to identify said collaborator(s). Interactions amongst various actors—e.g., a Client Device (500) operated by Fred, and the Insight Service (502)—are illustrated in conjunction with components shown across FIGS. 5A-5C and described (in an itemized manner) below. Said interactions, as well as processes performed on/by any particular actor may follow embodiments disclosed herein pertaining to learning acceleration using insight-assisted introductions as applied to the circumstances of the example scenario.

Turning to FIG. 5A:

1. User Fred, operating the Client Device (500), submits an introduction query to the Insight Service (502), where the introduction query specifies IoT and AI as interests 2. The Insight Service (502) obtains a metadata graph representative of a user catalog 3. Based on the first interest of IoT, the Insight Service (502) filters the metadata graph to identify node subset 1 of a set of nodes, at least in part, forming the metadata graph, where node subset 1 includes one or more nodes corresponding to user catalog entry/entries (i.e., user profile(s)) each specifying user metadata (or at least a portion thereof) matching the first interest of IoT Turning to FIG. 5B:

4. Based on the second interest of AI, the Insight Service (502) filters the metadata graph to identify node subset 2 of a set of nodes, at least in part, forming the metadata graph, where node subset 2 includes one or more nodes corresponding to user catalog entry/entries (i.e., user profile(s)) each specifying user metadata (or at least a portion thereof) matching the second interest of AI 5. The Insight Service (502) generates a k-partite (i.e., bi-partite) metadata graph using node subsets 1 & 2

Turning to FIG. 5C:

6. The Insight Service (502) identifies a super node and a near-super node in/of the k-partite metadata graph 7. The Insight Service (502) extracts a portion of user metadata from user catalog entries corresponding to the super node and near-super node, where the portion of user metadata includes user identifiers (e.g., Brad and Jill), user domain(s) (e.g., IoT, AI, and quantum computing for User Brad; IoT, AI, and graph theory for User Jill), and contact information (e.g., brad@organization.com for User Brad; jill@organization.com for User Jill) associated with other organization users (e.g., User Brad and User Jill) to which the extracted portion of user metadata belongs 8. In response to the submitted introduction query, the Insight Service provides the user identifiers, user domain(s), and contact information for Users Brad and Jill to the Client Device (500) or, more specifically, to User Fred While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for processing introduction queries, the method comprising:

receiving an introduction query to identify a user within an organization, wherein the query comprises at least one interest;

obtaining a metadata graph comprising nodes and edges, wherein the metadata graph comprises a first data structure, wherein each of the nodes is representative of a user catalog entry of a plurality of user catalog entries and each edge is representative of a relationship between associated nodes, wherein the metadata graph is generated based on metadata associated with the plurality of user catalog entries, and wherein the plurality of user catalog entries are collected via insight agents operating on a client device;

filtering, based on a comparison between the at least one interest and the metadata associated with the plurality of user catalog entries, the metadata graph to identify at least one node subset;

generating a k-partite metadata graph using the at least one node subset, wherein the k-partite metadata graph comprises k independent sets of nodes and edges between node pairs belonging to separate sets of the k independent sets, wherein k is greater than 1, and wherein the k-partite metadata graph comprises a second data structure smaller than the first data structure;

identifying at least one organization user based on the k-partite metadata graph by:

identifying a super node in the k-partite metadata graph, wherein the super node corresponds to a first user catalog entry of the user catalog, wherein the first user catalog entry maps to a first organization user of the at least one organization user, wherein the super node is automatically determined based on a threshold number of edges connected to the super node, and wherein the threshold number of edges is dynamically calculated based on statistical analysis of edge distributions in the k-partite metadata graph;

identifying a near-super node in the k-partite metadata graph, wherein the near-super node corresponds to a second catalog entry of the user catalog, wherein the second user catalog entry maps to a second organization user of the at least one organization user;

extracting first user metadata from the first user catalog entry and second user metadata from the second user catalog entry, wherein the first user metadata pertains to the first organization user and the second user metadata pertains to the second organization user; and providing, in response to the introduction query, at least a portion of the first user metadata and at least a portion of the second user metadata to a third organization user excluded from the at least one organization user.

2. The method of claim 1, wherein the super node is representative of a node in the k-partite metadata graph that is an endpoint for a number of edges, wherein the number of edges at least satisfies a threshold number of edges.

3. The method of claim 1, wherein the second organization user seeks the at least one organization user to jointly produce collaborative work.

4. The method of claim 1, wherein the at least portion of the user metadata comprises a user identifier, at least one user domain matching the at least one interest, and user contact information.

5. The method of claim 1, wherein the near-super node is representative of a node in the k-partite metadata graph that is an endpoint for a number of edges, wherein the number of edges at least satisfies a first threshold number of edges and is less than a second threshold number of edges, wherein the second threshold number of edges serves as a criterion for identifying the super node.

6. A non-transitory computer readable medium (CRM) comprising computer readable program code, which when executed by a computer processor, enables the computer processor to perform a method for processing introduction queries, the method comprising:

receiving an introduction query to identify a user within an organization, wherein the query comprises at least one interest;

obtaining a metadata graph comprising nodes and edges,
    wherein the metadata graph comprises a first data structure,
    wherein each of the nodes is representative of a user catalog entry of a plurality of user catalog entries and each edge is representative of a relationship between associated nodes,
    wherein the metadata graph is generated based on metadata associated with the plurality of user catalog entries, and
    wherein the plurality of user catalog entries are collected via insight agents operating on a client device;

filtering, based on a comparison between the at least one interest and the metadata associated with the plurality of user catalog entries, the metadata graph to identify at least one node subset;

generating a k-partite metadata graph using the at least one node subset,
    wherein the k-partite metadata graph comprises k independent sets of nodes and edges between node pairs belonging to separate sets of the k independent sets, wherein k is greater than 1, and
    wherein the k-partite metadata graph comprises a second data structure smaller than the first data structure;

identifying at least one organization user based on the k-partite metadata graph by:
    identifying a super node in the k-partite metadata graph,
        wherein the super node corresponds to a first user catalog entry of the user catalog,
        wherein the first user catalog entry maps to a first organization user of the at least one organization user,
        wherein the super node is automatically determined based on a threshold number of edges connected to the super node, and
        wherein the threshold number of edges is dynamically calculated based on statistical analysis of edge distributions in the k-partite metadata graph;

identifying a near-super node in the k-partite metadata graph,
        wherein the near-super node corresponds to a second catalog entry of the user catalog,
        wherein the second user catalog entry maps to a second organization user of the at least one organization user;

extracting first user metadata from the first user catalog entry and second user metadata from the second user catalog entry, wherein the first user metadata pertains to the first organization user and the second user metadata pertains to the second organization user; and providing, in response to the introduction query, at least a portion of the first user metadata and at least a portion of the second user metadata to a third organization user excluded from the at least one organization user.

7. The non-transitory CRM of claim 6, wherein the super node is representative of a node in the k-partite metadata graph that is an endpoint for a number of edges, wherein the number of edges at least satisfies a threshold number of edges.

8. The non-transitory CRM of claim 6, wherein the second organization user seeks the at least one organization user to jointly produce collaborative work.

9. The non-transitory CRM of claim 6, wherein the at least portion of the user metadata comprises a user identifier, at least one user domain matching the at least one interest, and user contact information.

10. The non-transitory CRM of claim 6, wherein the near-super node is representative of a node in the k-partite metadata graph that is an endpoint for a number of edges, wherein the number of edges at least satisfies a first threshold number of edges and is less than a second threshold number of edges, wherein the second threshold number of edges serves as a criterion for identifying the super node.

11. A system, the system comprising:
    a client device; and
    an insight service operatively connected to the client device, and comprising a computer processor configured to perform a method for processing introduction queries, the method comprising:
        receiving, from the client device, an introduction query to identify a user within an organization, wherein the query comprises at least one interest;
        obtaining a metadata graph comprising nodes and edges,
            wherein the metadata graph comprises a first data structure,
            wherein each of the nodes is representative of a user catalog entry of a plurality of user catalog entries and each edge is representative of a relationship between associated nodes,
            wherein the metadata graph is generated based on metadata associated with the plurality of user catalog entries, and
            wherein the plurality of user catalog entries are collected via insight agents operating on a client device;
        filtering, based on a comparison between the at least one interest and the metadata associated with the plurality of user catalog entries, the metadata graph to identify at least one node subset;
        generating a k-partite metadata graph using the at least one node subset, wherein the k-partite metadata graph comprises k independent sets of nodes and edges between node pairs belonging to separate sets of the k independent sets, wherein k is greater than 1, and wherein the k-partite metadata graph comprises a second data structure smaller than the first data structure;

identifying at least one organization user based on the k-partite metadata graph by:

identifying a super node in the k-partite metadata graph, wherein the super node corresponds to a first user catalog entry of the user catalog, wherein the first user catalog entry maps to a first organization user of the at least one organization user, wherein the super node is automatically determined based on a threshold number of edges connected to the super node, and wherein the threshold number of edges is dynamically calculated based on statistical analysis of edge distributions in the k-partite metadata graph;

identifying a near-super node in the k-partite metadata graph, wherein the near-super node corresponds to a second catalog entry of the user catalog, wherein the second user catalog entry maps to a second organization user of the at least one organization user;

extracting first user metadata from the first user catalog entry and second user metadata from the second user catalog entry, wherein the first user metadata pertains to the first organization user and the second user metadata pertains to the second organization user; and providing, in response to the introduction query, at least a portion of the first user metadata and at least a portion of the second user metadata to a third organization user excluded from the at least one organization user.

* * * * *